United States Patent
Vaidya et al.

(10) Patent No.: US 9,606,797 B2
(45) Date of Patent: Mar. 28, 2017

(54) COMPRESSING EXECUTION CYCLES FOR DIVERGENT EXECUTION IN A SINGLE INSTRUCTION MULTIPLE DATA (SIMD) PROCESSOR

(71) Applicant: Intel Corporation, Santa Clara, CA (US)

(72) Inventors: Aniruddha S. Vaidya, Sunnyvale, CA (US); Anahita Shayesteh, Los Altos, CA (US); Dong Hyuk Woo, Campbell, CA (US); Saikat Saharoy, Cupertino, CA (US); Mani Azimi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 13/724,633

(22) Filed: Dec. 21, 2012

(65) Prior Publication Data

US 2014/0181477 A1    Jun. 26, 2014

(51) Int. Cl.
*G06F 9/30* (2006.01)
*G06F 9/38* (2006.01)

(52) U.S. Cl.
CPC ...... *G06F 9/30018* (2013.01); *G06F 9/30032* (2013.01); *G06F 9/30036* (2013.01); *G06F 9/30058* (2013.01); *G06F 9/30072* (2013.01); *G06F 9/30181* (2013.01); *G06F 9/3887* (2013.01)

(58) Field of Classification Search
CPC ............................ G06F 9/3887; G06F 9/30058
USPC ......................................................... 712/22
See application file for complete search history.

(56) References Cited

U.S. PATENT DOCUMENTS

| | | | |
|---|---|---|---|
| 6,976,182 B1 * | 12/2005 | Filippo | 713/324 |
| 7,627,735 B2 | 12/2009 | Espasa | |
| 8,626,700 B1 * | 1/2014 | Monraz et al. | 706/59 |
| 2003/0159022 A1 * | 8/2003 | Kondoh | 712/221 |
| 2004/0054879 A1 * | 3/2004 | Macy, Jr. | G06F 9/30014 712/221 |
| 2008/0082783 A1 * | 4/2008 | Mejdrich | G06F 15/8092 712/2 |
| 2008/0141004 A1 * | 6/2008 | Kershaw | G06F 9/30036 712/220 |

(Continued)

OTHER PUBLICATIONS

Charles C Lin, What are the steps to execute an instruction, Mar. 22, 2009, 6 pages, [retrieved from the internet on Apr. 19, 2015], retrieved from URL <http://www.cs.umd.edu/class/sum2003/cmsc311/Notes/Overall/steps.html>.*

(Continued)

*Primary Examiner* — Andrew Caldwell
*Assistant Examiner* — Jyoti Mehta
(74) *Attorney, Agent, or Firm* — Trop, Pruner & Hu, P.C.

(57) ABSTRACT

In one embodiment, the present invention includes a processor with a vector execution unit to execute a vector instruction on a vector having a plurality of individual data elements, where the vector instruction is of a first width and the vector execution unit is of a smaller width. The processor further includes a control logic coupled to the vector execution unit to compress a number of execution cycles consumed in execution of the vector instruction when at least some of the individual data elements are not to be operated on by the vector instruction. Other embodiments are described and claimed.

26 Claims, 11 Drawing Sheets

(56) References Cited

U.S. PATENT DOCUMENTS

| | | | | |
|---|---|---|---|---|
| 2009/0158013 | A1* | 6/2009 | Muff et al. | 712/222 |
| 2011/0219221 | A1* | 9/2011 | Skadron et al. | 712/235 |
| 2012/0204014 | A1* | 8/2012 | Leather et al. | 712/223 |
| 2013/0042090 | A1* | 2/2013 | Krashinsky | 712/214 |
| 2013/0179662 | A1* | 7/2013 | Choquette et al. | 712/206 |
| 2013/0326524 | A1* | 12/2013 | Houston | G06F 9/52 718/102 |

OTHER PUBLICATIONS

Vector Processing, Jun. 24, 2010, 44 pages, [retrieved from the internet on Apr. 19, 2014], retrieved from URL <http://web.cecs.pdx.edu/~mperkows/CAPSTONES/HAAR/vector.ppt>.*

Cache Memory, Sep. 10, 2006, 22 pages, [retrieved from the internet on Apr. 19, 2014], retrieved from URL <http://www.ece.northwestern.edu/~kcoloma/ece361/lectures/Lec14-cache.pdf>.*

Latch vs Register, Apr. 7, 2004, 2 pages, [retrieved from the internet on Apr. 19, 2014], retrieved from URL <http://forums.parallax.com/showthread.php/74290-Latch-vs-register>.*

Howard Huang, Basic circuit design and multiplexers, Jun. 23, 2003, 31 pages, [retrieved from the internet on Sep. 27, 2015], retrived from URL <howardhuang.us/teaching/cs231/04-Basic-circuit-design-and-multiplexers.pdf>.*

Babic, Register File Design and Memory Design, Oct. 20, 2008, 9 pages, [retrieved from the internet on Sep. 27, 2015], retrieved from URL <web.cse.ohio-state.edu/~teodores/download/teaching/cse675.au08/Cse675.02.E.MemoryDesign_part1.pdf>.*

Klimovitski, Using SSE and SSE2: Misconceptions and Reality, Mar. 2001, Intel Developer Update Magazine, 8 pages, [retrieved from the internet on Nov. 3, 2016], retrieved from URL <saluc.engr.uconn.edu/refs/processors/intel/sse_sse2.pdf>.*

W. Fung, et al., "Dynamic Warp Formation and Scheduling for Efficient GPU Control Flow," 2007, 12 pages.

W. Fung, et al., "Thread Block Compaction for Efficient SIMT Control Flow," 2011, 12 pages.

V. Narasiman, et al., "Improving GPU Performance via Large Warps and Two-Level Warp Scheduling," 2011, 10 pages.

T.D. Han, et al., "Reducing Branch Divergence in GPU Programs," 2011, 8 pages.

G. Diamos, et al., "SIMD Re-Convergence At Thread Frontiers," 2011, 12 pages.

J. Meng, et al., "Dynamic Warp Subdivision for Integrated Branch and Memory Divergence Tolerance," 2010, 12 pages.

* cited by examiner

US 9,606,797 B2

COMPRESSING EXECUTION CYCLES FOR DIVERGENT EXECUTION IN A SINGLE INSTRUCTION MULTIPLE DATA (SIMD) PROCESSOR

BACKGROUND

Many processors include the ability to perform operations on multiple operands concurrently. Typically these operations are performed in a single instruction multiple data (SIMD) arithmetic logic unit (ALU) of the processor. SIMD ALUs by definition have a single control flow for a wide number of data paths that require lock-step execution. High performance and execution efficiency result when SIMD control flow remains synchronized across all data paths, and aligned memory requests are made so that the wide memory bandwidth is well-utilized.

In some instances during execution, SIMD control flow cannot remain synchronized. This SIMD control flow divergence can occur, for example, when executing an "if/else" conditional block, such that some portions of the data paths are to execute the "if" portion and other portions the "else" portion, resulting in the notion of a branch divergence hazard. A common solution to address this hazard transforms the control flow problem into a data flow problem by sequentially executing all the control flow paths for all data paths. Here both the "if" portion of the block and the "else" portion are executed in turn by all data paths, and predicating (turning off) appropriate data paths in each paths. Nested control flow can further compound the divergence problem and can result in significant performance (compute throughput) loss. This loss of compute throughput due to diminished SIMD efficiency is called the SIMD divergence problem.

DETAILED DESCRIPTION

Figure 1:
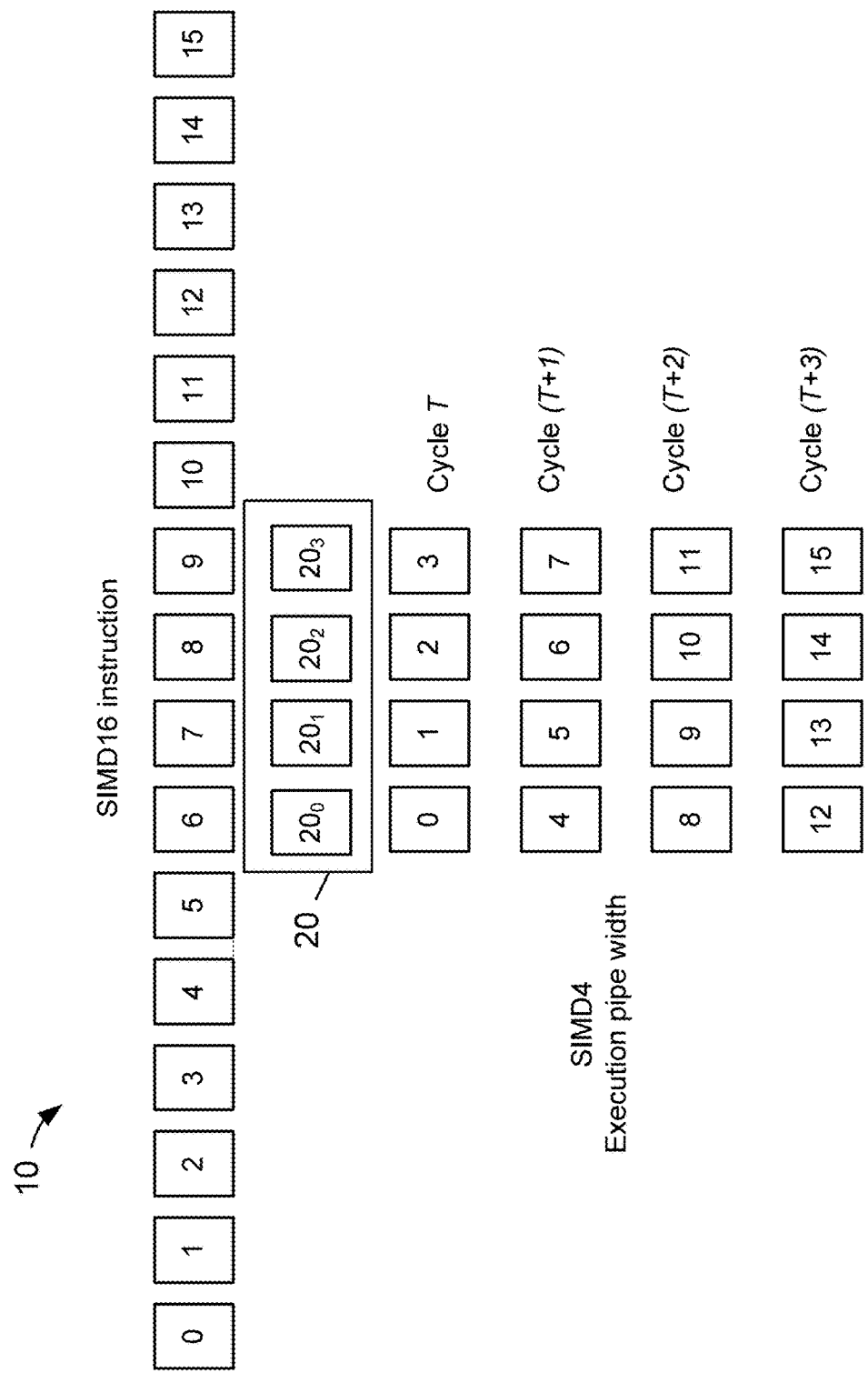
FIG. 1 is a block diagram of execution of a SIMD instruction to be executed in a SIMD execution unit of a processor.

In various embodiments, a processor may include logic to identify situations in which a single instruction multiple data (SIMD) instruction to be execution in a SIMD unit of the processor can be performed using a fewer number of execution cycles than otherwise would be allocated to the instruction. In various embodiments a SIMD instruction width can be larger than the corresponding execution unit data path width. For example, some instruction set architectures (ISAs) provide for SIMD instructions having operand widths of 8 or 16 individual data operands (collectively forming a vector of individual data elements). As used herein the individual data elements of a SIMD instruction are also referred to as channels. However, these processors include corresponding vector or SIMD execution units having a data path configured for less than the number of channels of the instruction. For example, some such processors that provide for 8 and 16-wide SIMD instructions provide a vector unit with data paths configured to handle 4 individual data elements concurrently. Thus these execution units provide for a fractional number of data paths (also referred to as lanes) as compared to the number of individual data elements corresponding to the instruction width. Note that as used herein, the terms "SIMD" and "vector" are used interchangeably.

Embodiments may provide logic within a front end unit of the processor such as within a decode logic to enable situations in which some or all the execution cycles allocated to a particular SIMD instruction can be compacted. In some embodiments, one or more channel enable masks may be associated with the instruction and can be analyzed to determine when opportunities for such cycle compaction exist. While particular micro-architectures and representative instruction widths and data path widths are described herein, understand the scope of the present invention is not limited in this regard and embodiments apply to any processor having a SIMD execution width less than a corresponding SIMD instruction width.

Several techniques may be used to perform execution cycle compression, also referred to herein as intra-warp compaction. Thus as used herein, the terms "compression" and "compaction" are used interchangeably. In one embodiment, these techniques include a basic cycle compression (BCC) technique and a swizzled cycle compression (SCC) technique. As described herein, BCC seeks to remove cycles in the execution pipeline in cases where any aligned set of N channels are to be unused for a particular cycle, where N is the number of lanes of the execution unit. SCC is a generalized form of BCC where channel positions are shuffled or swizzled prior to execution such that that they form groups of N-aligned enabled and disabled channels, and then execution cycles may be removed for any group of N-aligned disabled channels. These techniques enable a wide range of divergent workloads to reduce to compute cycles.

In some embodiments, SIMD execution units in various engines of a processor such as a graphics processing unit (GPU), accelerator or other functional logic may be used for performance and energy efficient acceleration of general-purpose applications. However, control flow divergence can affect execution efficiency in some applications, called divergent applications. Embodiments may be used with a wide class of applications that exhibit high levels of control flow divergence. Although the scope of the present invention is not limited in this regard, such applications may include ray tracing, graph traversal (e.g., breadth-first-search), face detection, certain graphics workloads and applications in other domains that exhibit divergence.

In operation, certain highly data parallel chunks or kernels of computation from an application may be offloaded to one or more GPUs or other compute engine for high performance and energy efficient acceleration. Such GPUs can efficiently execute data parallel programs written in OpenCL, Nvidia's CUDA, and Microsoft's DirectCompute language environments that have been specifically developed for general purpose GPU (GPGPU) computing. The principal compute elements on a GPU are multiple, highly-threaded SIMD compute cores called execution units (EUs). Architectural/micro-architectural enhancements to such EUs may improve the performance and efficiency of data parallel programs having divergent operations which would otherwise suffer.

Referring now to FIG. 1, shown is a block diagram of execution of a SIMD instruction to be executed in a SIMD execution unit of a processor. As shown in FIG. 1, a SIMD instruction 10 is a 16-wide instruction in that the instruction specifies execution of a particular operation on 16 individual data elements (numbered 0-15 in FIG. 1). However many SIMD execution units do not have such a wide width. Instead in many implementations the data path width of a SIMD execution unit may be a fraction of the instruction width. In the example shown, the SIMD execution unit has a width of 4 parallel lanes such that to execute the 16-wide instruction a number of cycles are consumed (namely 4 cycles in this example). Thus with a SIMD execution unit 20 having a plurality of lanes $20_0$-$20_3$, to fully execute the 16-wide instruction, four processor cycles T to T+3 are consumed. Although described with this particular example, understand that different processor architectures are possible and more or fewer lanes may be present in an execution unit. Furthermore, understand that different SIMD instruction widths are possible, with a SIMD instruction providing for execution of 2 or more individual data elements in parallel.

Thus according to various ISAs, a SIMD instruction includes a large number of SIMD channels (called the SIMD execution width) that is a multiple of the actual hardware data path width. For example, in an implementation SIMD instructions may have a width of 8, 16, or 32 while the floating point unit (FPU) in an EU pipeline is 4-wide (meaning it can execute 4 parallel floating point (FP) operations per cycle), each on a 32 bit(b) data element. As a result, maximum effective throughput for a set of independent back-to-back SIMD16-wide instructions for this FPU would be one instruction completed every 4 cycles due to the difference between the instruction width and FPU width. Thus as shown in FIG. 1, a set of 4 contiguous channels out of the 16 channels in the instruction are sequenced through the 4-wide FPU over 4 cycles in a pipelined manner. Similarly, a SIMD8-wide instruction would flow through this FPU pipeline stage in 2 cycles and a SIMD32-wide instruction would take 8 cycles.

In cases where a SIMD instruction causes a SIMD control flow divergence, an increase in the dynamic instruction count of SIMD instructions executed by all of the channels may increase even when only a subset of channels are enabled and doing useful work. Embodiments provide for optimization opportunities by seeking to compress some or all of the execution cycles that are consumed by disabled channels. These disabled channels are for data elements that are "don't cares", in that they (and any results of operation execution on these elements) are not used further in program execution. In order to determine the potential for divergence optimizations in reducing execution cycles, a metric called "SIMD efficiency" may be analyzed that is the ratio of the average number of enabled channels per executed instruction and the average SIMD width of the executed instructions over the entire kernel execution. Applications with high SIMD efficiency (at or very close to 1.0) imply very few divergent instructions executed in the code and are called coherent applications. On the other hand, the farther away the SIMD efficiency is from 1.0, the higher the performance potential from divergence optimizations.

In BCC, each set of channels in a SIMD instruction that represents one full cycle of execution through the pipeline where all of those channels are disabled can be harvested or removed and re-used by enabled channels of the same or different SIMD instruction. In an embodiment, this cycle harvesting may be performed in the instruction decode stage by examining a final computed value of a SIMD execution mask. For each such set of channels, fetching of operands, issuing of the corresponding operations to the execution pipeline and writing back of the results are suppressed and those for the following set of channels are issued. If there is no work (or additional work) to be issued for the current instruction, then the available slot (corresponding an execution cycle) is used for subsequent instruction, such that a first channel of a next SIMD instruction may be inserted into the pipeline.

Figure 2:
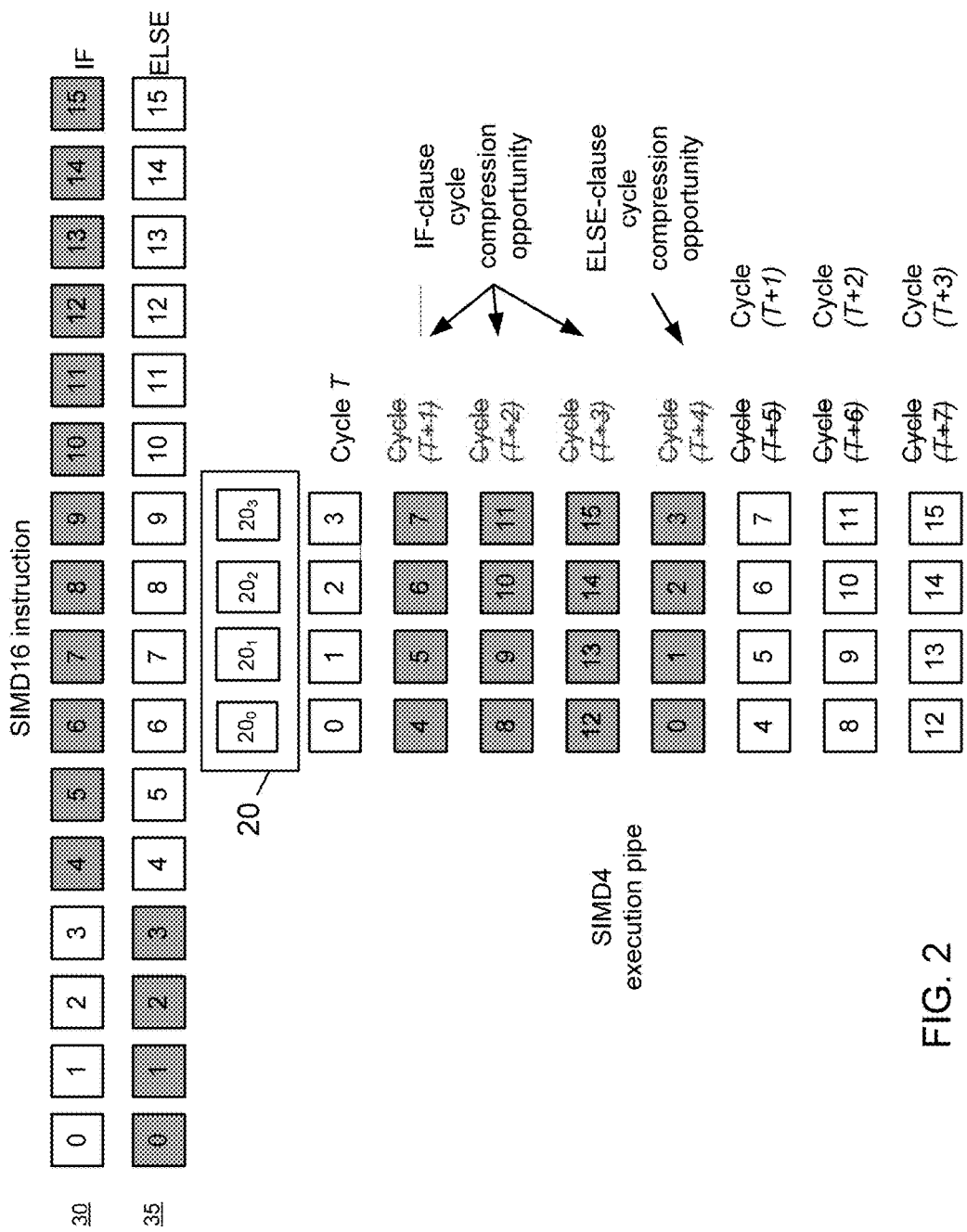
FIG. 2 is an illustration of a basic cycle compression technique for handling a divergence condition in accordance with an embodiment of the present invention.

Referring now to FIG. 2, shown is a basic cycle compression technique for handling a divergence condition corresponding to an IF/ELSE block. Cycles where all channels are disabled can be removed, resulting in execution time savings. As seen in FIG. 2, a first SIMD instruction 30 is used to perform the IF branch of an IF/ELSE code segment, while a second SIMD instruction 35 is used to perform the ELSE branch of the code segment. In the illustration of FIG. 2, note that the unshaded channels of these instructions are those to be executed for the corresponding instruction, while the shaded channels are those channels that are to be disabled for the corresponding instruction.

An example of an IF/ELSE code segment that triggers the two instructions is shown in Table 1 below:

TABLE 1 i=get_local_id(0)
if(i%16 < 4) x = a+b;
else x = a−b;

As seen in Table 1, depending on the conditional operation, namely the modulo operation an operator i, which corresponds to the channel values (0 to 15), either an IF instruction (x=a+b) is executed or an ELSE instruction (x=a−b) is executed for each of the channels of.

As seen in FIG. 2, an original plurality of execution cycles T to T+7 are shown, which are the number of execution cycles to fully perform the 2 SIMD instructions. The unshaded cycles are the execution cycles to be sent to the processor pipeline while the corresponding shaded cycles can be compacted, resulting in execution time saving. As seen in FIG. 2, the IF block is executed by only 4 out of 16 channels (conversely the ELSE block is executed by 12 out of 16 channels). With BCC, 3 out of 4 cycles for execution of an instruction that executes the IF block can be harvested, while 1 cycle during the execution of an instruction for the ELSE block can be harvested. Put together a total of 4 out of 8 execution cycles can be harvested by BCC for the IF/ELSE block. In this particular instance, this would be same as the time for execution of a single instruction without the divergence caused by the IF/ELSE segment of code. Also note that although divergence optimizations may be useful for improving performance under control flow divergence, BCC is applicable for harvesting execution cycles in all cases where dispatch, control flow or predication results in disabled channels.

In an embodiment, a dispatch mask is used to selectively disable a subset of channels in an EU thread from the point of dispatch all the way to the end of the EU thread's execution (entire lifetime of the thread). Consider a GPGPU kernel launched with 500 work items. If the maximum work group size supported on the processor is 256, then 2 workgroups are launched with 250 work items each. For a GPU that executes SIMD16 code (16 channels supported per EU thread execution), 15 EU threads will have 16 work items (for a total of 240), while the sixteenth EU thread will have only 10 work items. All EU threads run identical SIMD16 code, so enabling 10 of 16 work items in the sixteenth EU thread of the work group may be accomplished by having the dispatch mask for this thread disable the last 6 channels of the 16 channels. In such a case, cycle compression opportunities exist all through the thread's execution (even in the absence of control flow divergence). BCC and/or SCC techniques can harvest these opportunities.

In certain GPU ISAs, individual instructions are permitted to have predicates (with a per channel prediction mask). Depending on the predication mask values for a given instruction, cycle compaction opportunities are presented for that instruction that may be harvested by BCC/SCC techniques. Control flow divergence also may be caused by program constructs such as while loops where different channels exit or skip loop iterations at different points. This can occur due to break or continue statements being executed by some channels and not by other channels, or different evaluation of loop exit conditions. Other cases may occur due to subroutine or function calls being executed by a subset of channels. Embodiments may be used in all these examples to compact execution cycles as described herein.

Thus in an embodiment, a decode unit may include a cycle compression or compaction logic to identify situations in which BCC and/or SCC may be introduced to reduce execution cycles based at least in part on information present in one or more masks associated with a particular SIMD instruction. This logic may be configured to determine situations where specific parts of instruction execution can be disabled based on enabled/disabled channels and the operand datatype being used. The number of execution cycles and number of operand registers accessed depend on datatypes and execution width of the instruction. For example, the number of execution cycles can be lower or higher based on whether operands are short integer, float or double precision. Operand accesses from the register file may be controlled, ideally partial operand read/write per cycle over multiple cycles in order to maintain sufficient read/write bandwidth to the register file and save energy by not fetching/writing operands for sets of disabled channels.

Overall BCC benefit depends on the relative frequency of low SIMD efficiency instructions in executing a kernel with favorable patterns of turned off channels. The benefit from execution cycles saved also depends on datatypes used by instructions. Benefits for wider datatypes (doubles and long integers) that take more cycles through the execution pipeline may be higher and narrow datatypes (half float/short) would be lower.

Figure 3:
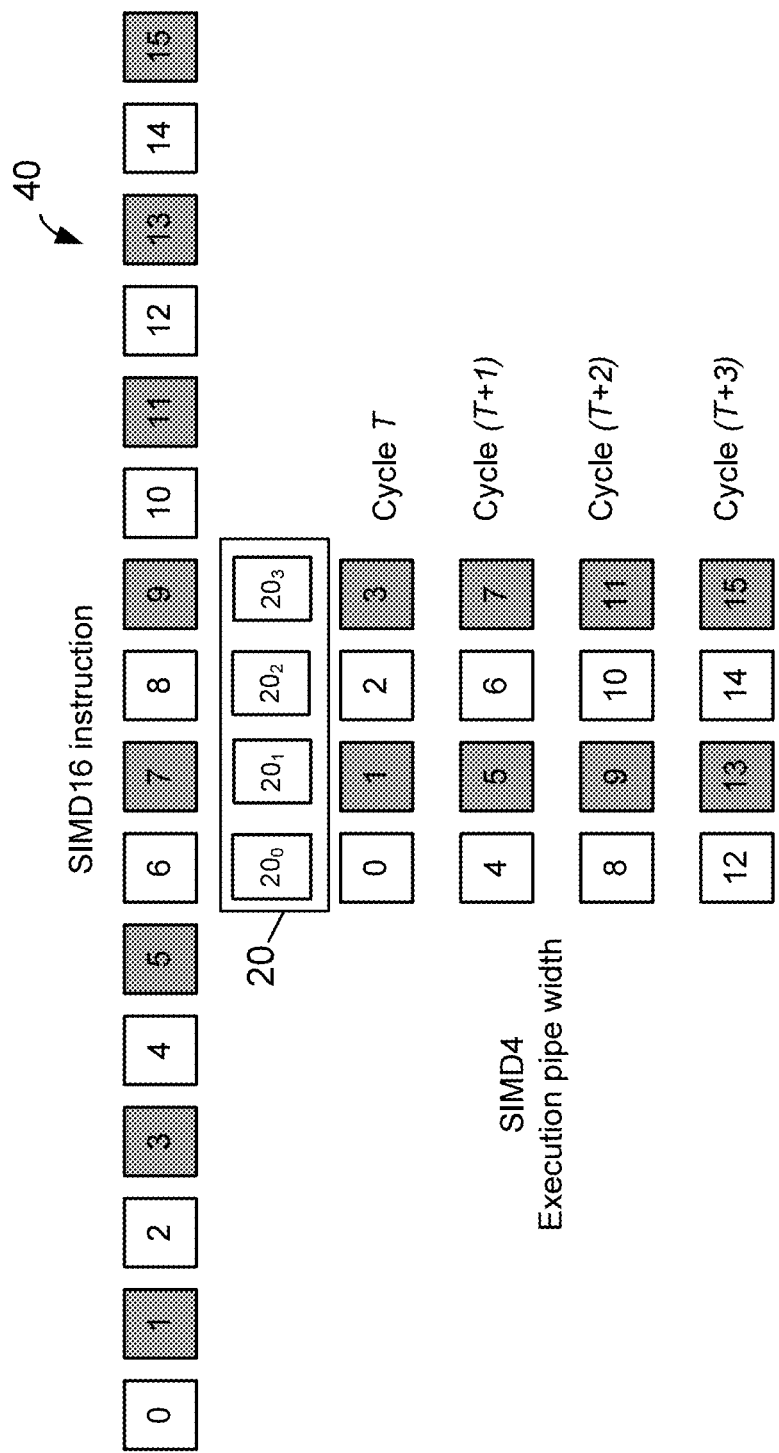
FIG. 3 is an illustration of a SIMD instruction that has an unfavorable arrangement for performing cycle compression in accordance with an embodiment of the present invention.

Note that some divergence patterns do not favor BCC. In particular, when disabled channels in an instruction are not contiguous, or are contiguous but not favorably aligned to the SIMD pipeline width, BCC cannot be used to take advantage of cycle compression opportunities. One such example is illustrated in FIG. 3. As illustrated in FIG. 3, a SIMD instruction 40 has an unfavorable arrangement for performing BCC. Instead as seen, alternating channels are enabled/disabled. Thus as seen, for each of a plurality of execution cycles T to T+3, some number of channels are enabled while others are disabled.

In an embodiment, this situation may occur as a result of the example code shown in Table 2.

TABLE 2 i=get_local_id(0)
if(i%2 == 0) e++;
else o++;

In order to address such cases, SCC instead may be used. In SCC, a SIMD instruction is examined to determine the number and positions of channels that are disabled. The positions of disabled and enabled channels are then rearranged into groups if possible such that the groups of disabled channels enable harvestable execution cycles.

Figure 4:
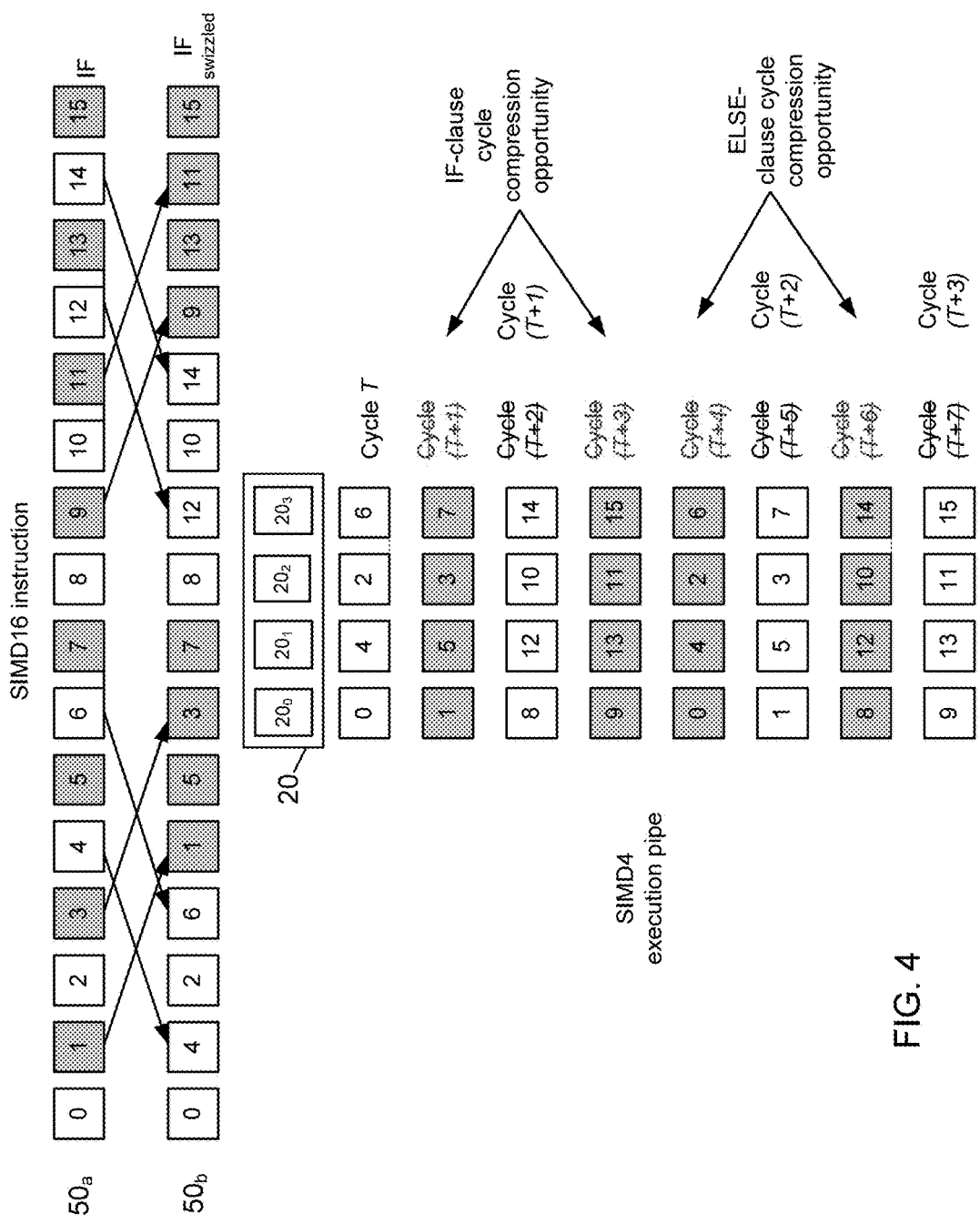
FIG. 4 is an illustration of a swizzle cycle compression technique for handling a divergence condition in accordance with an embodiment of the present invention.

SCC in accordance with an embodiment of the present invention is shown in FIG. 4. In an embodiment, rearranging channel positions is done through operand swizzling (permutation) hardware prior to being dispatched to the execution pipeline. In turn, destination operand positions are correspondingly unswizzled prior to writeback to the register file or other portion of a memory hierarchy. In some embodiments, decoder logic may be used to identify the appropriate swizzle and unswizzle settings. Harvestable execution cycles are identified and not issued to the execution pipeline. In some embodiments, channel-wise addressability in the register file may be provided to achieve fetch bandwidth and energy savings. Thus with SCC, channel positions can be swizzled to coalesce enabled and disable channels to enable execution cycles for disabled channels to be harvested by SCC.

As illustrated in FIG. 4, predicated channels can be grouped together by swizzling and then not sending them to the execution pipeline. Accordingly, for instructions 50a and 50b (which corresponds to the IF instruction illustrated in Table 2 above, before and after swizzling), swizzling operations can be done from an original arrangement of the channels to realize a swizzled arrangement of the channels. With this permuted arrangement of channels, multiple opportunities for disabling channels for a particular execution cycle can be realized. Thus as shown in FIG. 4, the shaded cycles may correspond to opportunities for execution cycle compression afforded using channel swizzling as described herein.

As representative examples, in cases where 5-8 out of 8 lanes are active for SIMD8 instructions or 13-16 lanes for SIMD16 instructions, there is no cycle time reduction possible using BCC or SCC. When fewer than these numbers of lanes are to be active in SIMD instruction execution, embodiments may provide opportunities to harvest cycle time savings: for example 9-12 out of 16 channels enabled implies that either BCC or SCC can optimize 1 cycle for such instructions; 5-8 out of 16 enable channels could represent opportunities for a partial shootdown in which the additional channels are not sent to the pipeline and power savings may be realized. That is, when one or more execution cycles are harvestable and an available enabled channel is not present to be inserted, embodiments may cause the pipeline to be powered down to reduce power consumption. Note that in various embodiments, the determination of which (and whether to use) BCC and/or SCC depend on the position of the disabled channels in each case, among other factors.

Embodiments may thus combine only enabled lanes in distinct EU threads executing the same instruction to form a new EU thread with better lane utilization. Embodiments thus provide divergence optimization opportunities within a single warp or wide SIMD instruction. In some situations, embodiments permute channels to group them compactly into enabled and disabled groups such that execution cycle compression can then be performed.

Using an embodiment of the present invention where an EU executes a SIMDx instruction (where x is the instruction width) over x/N consecutive cycles (where N is the number of lanes), the number of cycles to execute the instruction can be reduced. In this way, increased SIMD efficiency may be realized without a significant increase in micro-architectural complexity. In a 4 lane SIMD execution unit, BCC squeezes out cycles in the execution pipeline where any aligned set of 4 channels are turned off. SCC relaxes the alignment condition by performing swizzling of operands before and after execution.

Embodiments may leverage information from various masks for disabling specific channels such as during the dispatch of an EU thread, predication of individual instructions and predication to handle control flow instructions.

Figure 5:
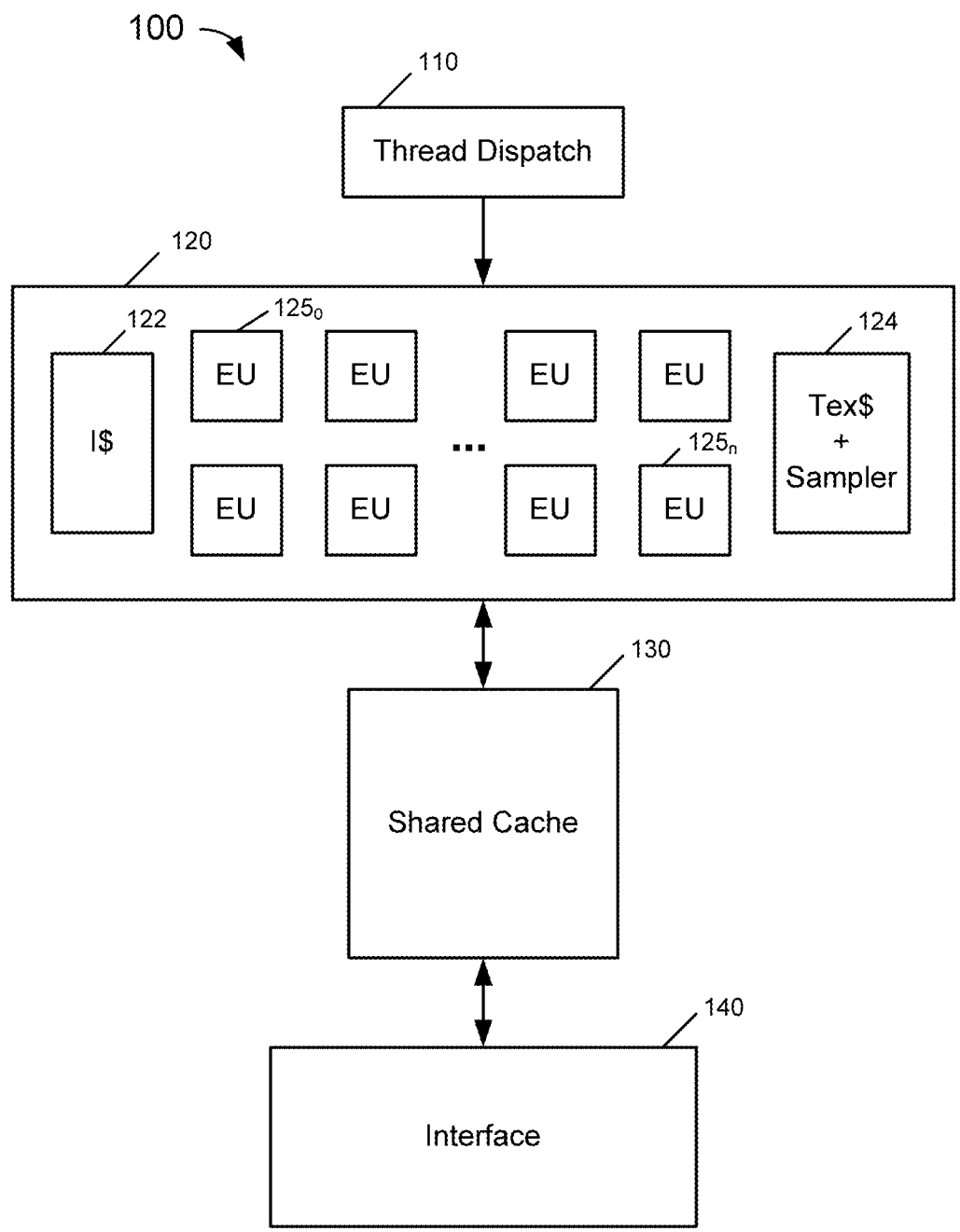
FIG. 5 is a block diagram of a graphics domain of a processor in accordance with an embodiment of the present invention.

Referring now to FIG. 5, shown is a block diagram of a graphics domain of a processor in accordance with an embodiment of the present invention. As shown in FIG. 5, domain 100 includes a thread dispatch unit 110 that receives incoming threads and dispatches them to a compute cluster 120 that includes a plurality of individual execution units $125_0$-$125_n$. Although the scope of the present invention is not limited in this regard in some embodiments between 4 and 16 EUs may be present. As further seen, these EUs may share an instruction cache 122 and a texture cache and sampler 124. In turn, compute cluster 120 couples to a shared cache memory 130 which in an embodiment may be a level 3 cache that in turn couples through an interface 140 to other components of a processor such as a ring interconnect that couples the graphics domain with a core domain and a system agent. In addition, the ring interconnect further couples the graphics domain to a larger shared cache structure such as a last level cache that in turn couples to further portions of a memory hierarchy such as a system memory.

Figure 6:
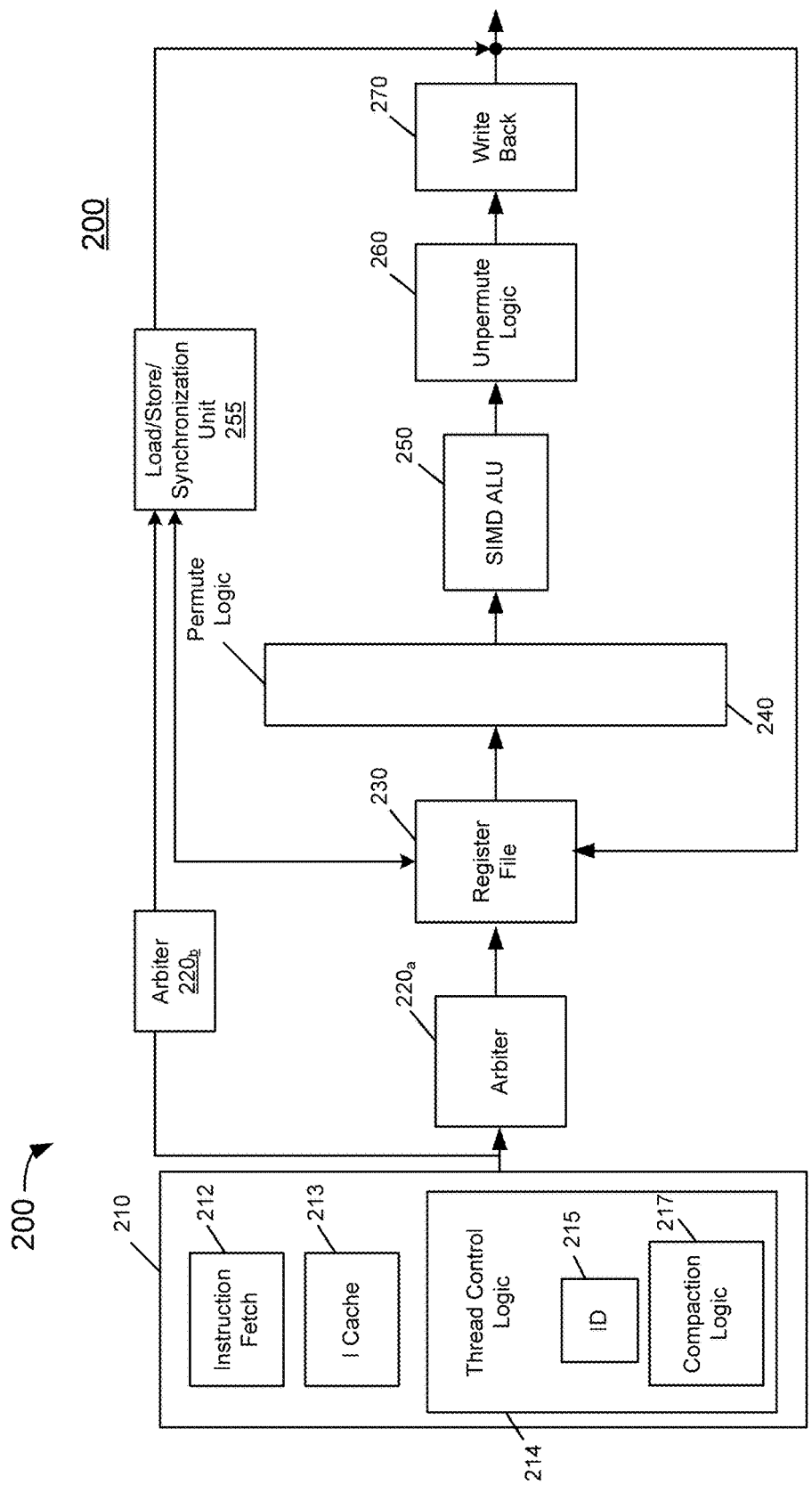
FIG. 6 is a block diagram of an execution unit in accordance with an embodiment of the present invention.

Referring now to FIG. 6, shown is a block diagram of an execution unit in accordance with an embodiment of the present invention. As shown in FIG. 6, execution unit 200 may be a pipelined processor, e.g., corresponding to one of the EUs of FIG. 5, that generally includes front end units, execution units and backend units. Note that execution unit 200 may be configured to execute instructions for a variable width SIMD ISA.

More specifically, execution unit 200 includes front end units 210 including an instruction fetch unit 212 and an instruction cache 213. In addition a thread control logic 214 may be provided in implementations in which a multi-threaded execution unit is present. As seen, thread control logic 214 includes an instruction decoder 215 (e.g., per thread) as well as compaction logic 217 in accordance with an embodiment of the present invention that can perform compaction responsive to received information, including an execution mask that can be determined based on various dependency checks, predication control, flow control and so forth. In an embodiment, information from instruction encoding such as an instruction predicate mask can be used along with channel mask registers including a dispatch mask, a conditional mask among others may be used to dynamically compute the execution mask that is used in turn by compaction logic 217 to determine whether opportunities are present to compact one or more execution cycles in performance of a given SIMD instruction.

In an embodiment compaction logic 217 identifies an appropriate swizzle setting for the operands based on the computed execution mask to produce compacted lanes, resulting in an optimized execution cycle compression. Unswizzle settings are the inverse permutation of the execution swizzle settings. Also prior to exploring appropriate swizzling, a count of the enabled lanes is used to identify the number of possible optimized swizzle outcomes and minimize the number of lanes to be swizzled. For example, in 32b SIMD16 operations, at most 12 lanes can be enabled to result in a 1 cycle execution compaction. Selection of appropriate swizzle/unswizzle patterns can be done by logic or table look up in various embodiments.

Still referring to FIG. 6, the resulting decoded instructions are provided to a pair of parallel arbiters $220_a$ and $220_b$ that select respectively: appropriate instructions of a given thread for passing to a register file 230, which enables fetching of operands to be used in performing instructions; and a given load, store or synchronization instruction to be provided a load/store/synchronization unit 255, which in turn is in communication with register file 230. Responsive to an instruction, unit 255 may select an operand(s) to write out from or load into register file 230. Results from unit 255 may also be output from the pipeline, e.g., to a memory hierarchy, texture cache, sampler or other destination.

In an embodiment, register file 230 may include a number of 256b wide registers. In turn, the resulting operands may be provided through a permute logic 240, which can perform swizzling as described herein to thus enable the appropriate values to be provided to each lane of a multi-lane SIMD ALU 250. In an embodiment, the ALU may be a SIMD4 floating point ALU. In an embodiment, various integer and floating point instructions including fused multiply add (FMA) instructions can be performed in the floating point ALU, while a separate parallel extended math ALU can be used to perform various extended math instructions such as divide, square root, sin, cosine and other such operations. The results computed in ALU 250 may be provided to an unpermute logic 260 which can reverse any swizzle operations that were previously performed. Finally, the results can be provided through a writeback stage 270 to a destination location such as the register file, a local cache or other portion of a memory hierarchy. Although shown at this high level in the embodiment of FIG. 6, understand the scope of the present invention is not limited in this regard.

Figure 7A:
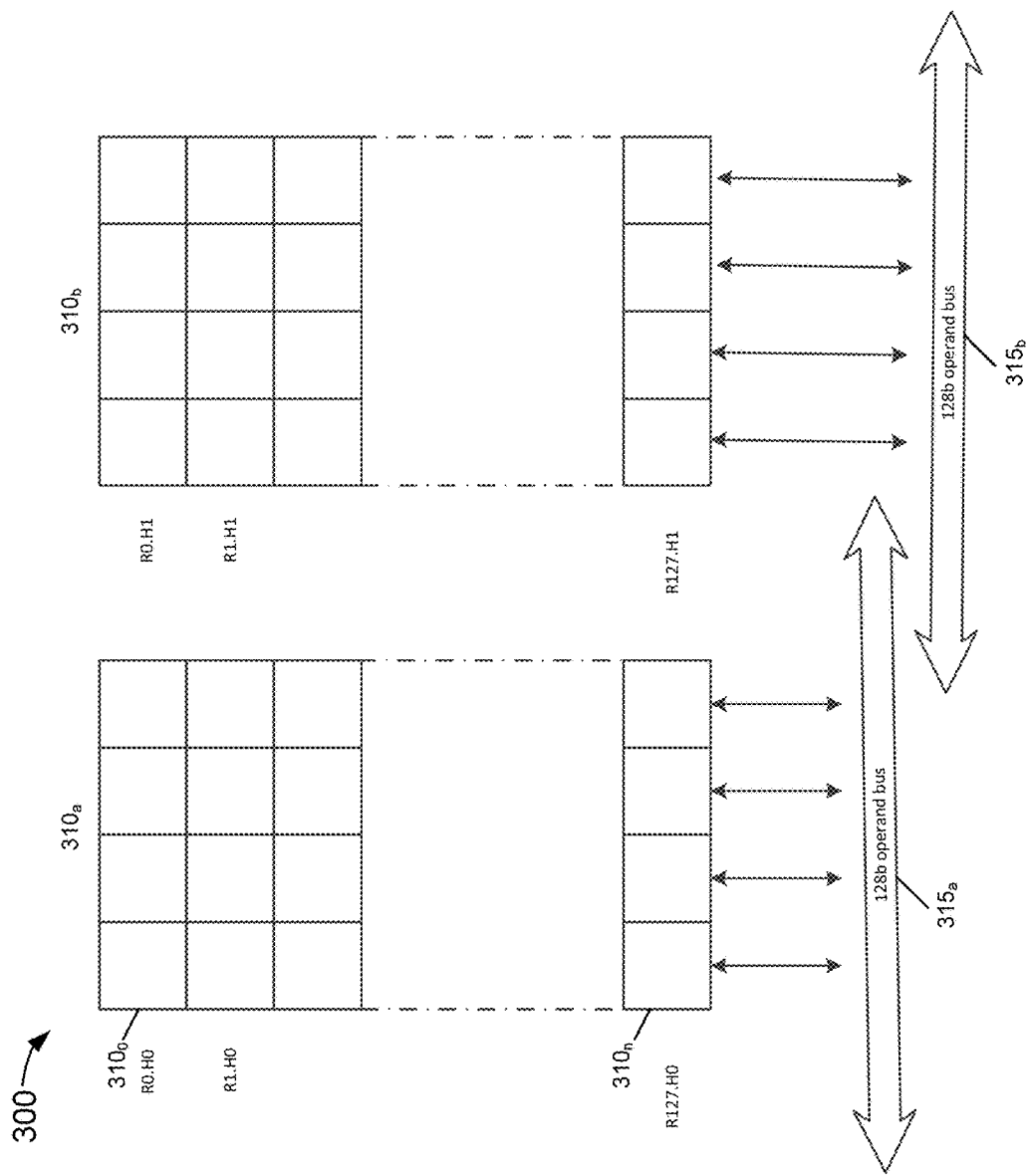
FIG. 7A is a block diagram of a register file in accordance with an embodiment of the present invention.

Referring now to FIG. 7A, shown is a block diagram of a register file in accordance with an embodiment of the present invention. As shown in FIG. 7A, register file 300 may be configured as a split register file having a plurality of registers $310_0$-$310_n$. As seen the registers can be implemented as so-called half registers such that each register includes a low portion $310_a$ and a high portion $310_b$. In turn, each half register width may store 4 lanes of information. In an embodiment in which the register file width is 256b, each half register may be 128b and thus each 4-lane segment of the corresponding half register can store a 32b value. Data is provided to and from the registers via an operand bus $315_a$ and $315_b$, as seen.

Figure 7B:
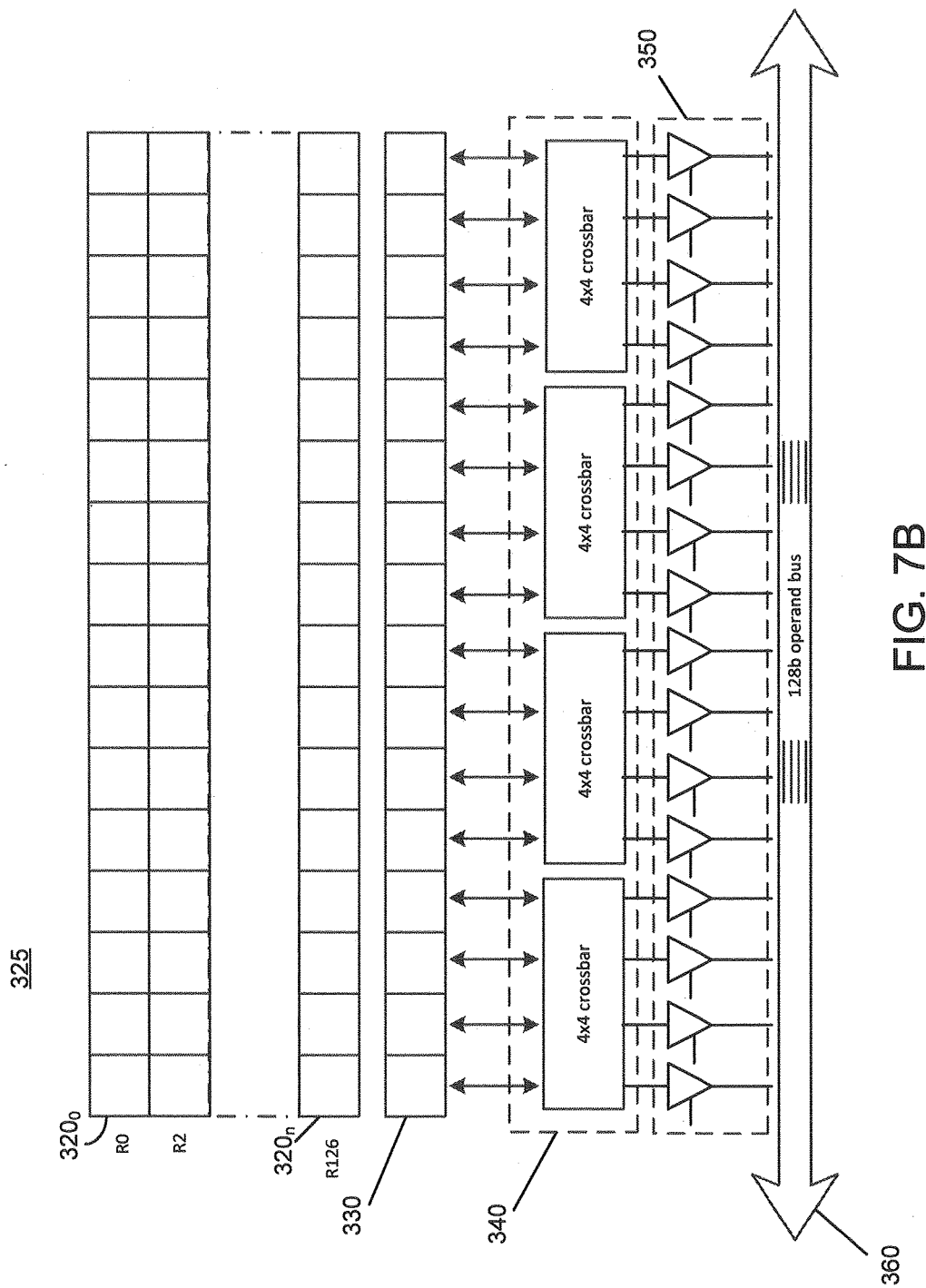
FIG. 7B is a block diagram of a register file in accordance with another embodiment of the present invention.

Referring now to FIG. 7B, shown is a block diagram of a register file in accordance with another embodiment of the present invention. More specifically, FIG. 7B shows an arrangement of a register file 325 having a plurality of registers $320_0$-$320_n$. In this embodiment, these registers may be 512b width registers having 16 lanes (with each lane storing a 32b value). As operands are selected from a given register they are filled into an operand latch 330. From there operands are provided through a crossbar 340 which as seen can be implemented as a 4×4 cross bar that is thus segmented into 4 quadrants. These crossbars can be controlled responsive to swizzle information, e.g., from compaction logic of the instruction decoder to thus permute the corresponding elements of the different lanes to output appropriate values to a plurality of enable switches 350. In turn when these switches are enabled the associated data element is allowed to be passed to an operand bus 360. Although shown at this high level in the embodiment of FIG. 7B, understand that other register arrangements and permute logic may be realized in other embodiments.

Using an embodiment of the present invention, the number of lane changes/swizzles may be minimized. Compaction logic may eliminate compactions that do not result in cycle savings and at the same time use the lowest number of swizzles or lane changes. Embodiments can be performed in hardware, software, firmware or combinations thereof. This compaction may be performed in parallel to dependency checks, and can start as soon as an execution mask is ready. The objective is to minimize lane moves, and provide control inputs to swizzle logic. This algorithm assumes moving the lanes between quadrants in their current position has no cost. In an embodiment, the algorithm uses the below values based on an execution mask.

Active-Quadrant-Cnt is the number of quadrants (in an embodiment having 4 lanes), in which at least one lane is active. In an embodiment, this can be determined by examining the execution mask for each quadrant. For example, the Active-Quadrant-Cnt is the number of quadrants in a SIMD16 instruction with at least one enabled lane.

Active-Lane-Cnt is the number of active lanes, corresponding to the total number of lanes that are enabled in the SIMD instruction. In an embodiment, this can be calculated by adding all "1"s in the execution mask.

The logic first determines the optimal execution cycles, namely minimum required cycles for executing the instruction after compaction is applied. This value is dependent on total number of active lanes, regardless of the pattern and can be calculated according to EQ. 1 (for a 4-wide data path).

Optimal-Cycle-Cnt=Ceiling(Active-Lane-Cnt/4)    [EQ. 1]

Comparing the Optimal-Cycle-Cnt with Active-Quadrant-Cnt determines if SCC can provide further cycle saving, to decide if compaction should be applied or not, as follows:

If (Active-Quadrant-Cnt==Optimal-Cycle-Cnt);

Do nothing since compaction does not provide any benefit.

If compaction is determined to be helpful, the number of active (enabled) lanes in each quadrant position of the SIMD16 instruction is calculated. For example active Lane1's value shows how many quadrants have an active lane in position 1.

Active-LaneN is the number of active lanes in position N (where N belongs to 1-4, 4 is the width of execution unit).

Next, the total number of swizzles and the source lanes for those swizzles are calculated. For each lane position N (1-4)), the difference between Active-LaneN and Optimal-Cycle-Cnt determines how many swizzles from that position are to be made, as follows in Table 3.

TABLE 3

For each lane N (N from 1 to the execution width), if
(Active-LaneN > Optimal-Cnt)
    Swizzle LaneN = ActiveLaneN – Optimal-Cycle-Cnt;    If
for
any position this value is larger than Optimal-Cnt, that
lane will swizzle.

Now that the number and sources of swizzles are specified, the destinations can be determined. Going over quadrants in order, each quadrant tries to fill in the disabled lanes first from lanes in other quadrants but similar position, if not found by borrowing from one of the sources specified in previous step. New quadrants are created until all Optimal-Cycle-Cnt quadrants are generated. At this point, it is guaranteed that all lanes earlier marked as swizzled have been used in new quadrants.

TABLE 4

Do above operations of Table 3, a total of Optimal-Cycle-Cnt
times;
For each lane (1 to ExecutionWidth )
Find active lane, checking quadrants in order;
If no active lane found, borrow from LaneM, where
SwizzleLaneM > 0; SwizzleLaneM--;

In an embodiment that seeks to minimize the number of moves between quadrants, the following algorithm of Table 5 may be used.

TABLE 5

Total-Active-Cnt = total active lanes in SIMD16
Optimal-Cnt = Ceiling (Total-Active-Cnt / 4)
If (Active-Quadrant-Cnt == Optimal-Cnt)
    do nothing;
else
    Sort Quadrants;
    Pick the ones with fewest active lanes, merge it in others;
(Repeat this step for the difference between Active-Quadrant-Cnt
and Optimal-Cnt;).

Note that embodiments may be applied to an out-of-order processor in an in-order processor, a reduced instruction set computing (RISC) processor such as an ARM-based processor, or a processor of another type of ISA that can emulate instructions and operations of a different ISA via an emulation engine and associated logic circuitry.

Figure 8:
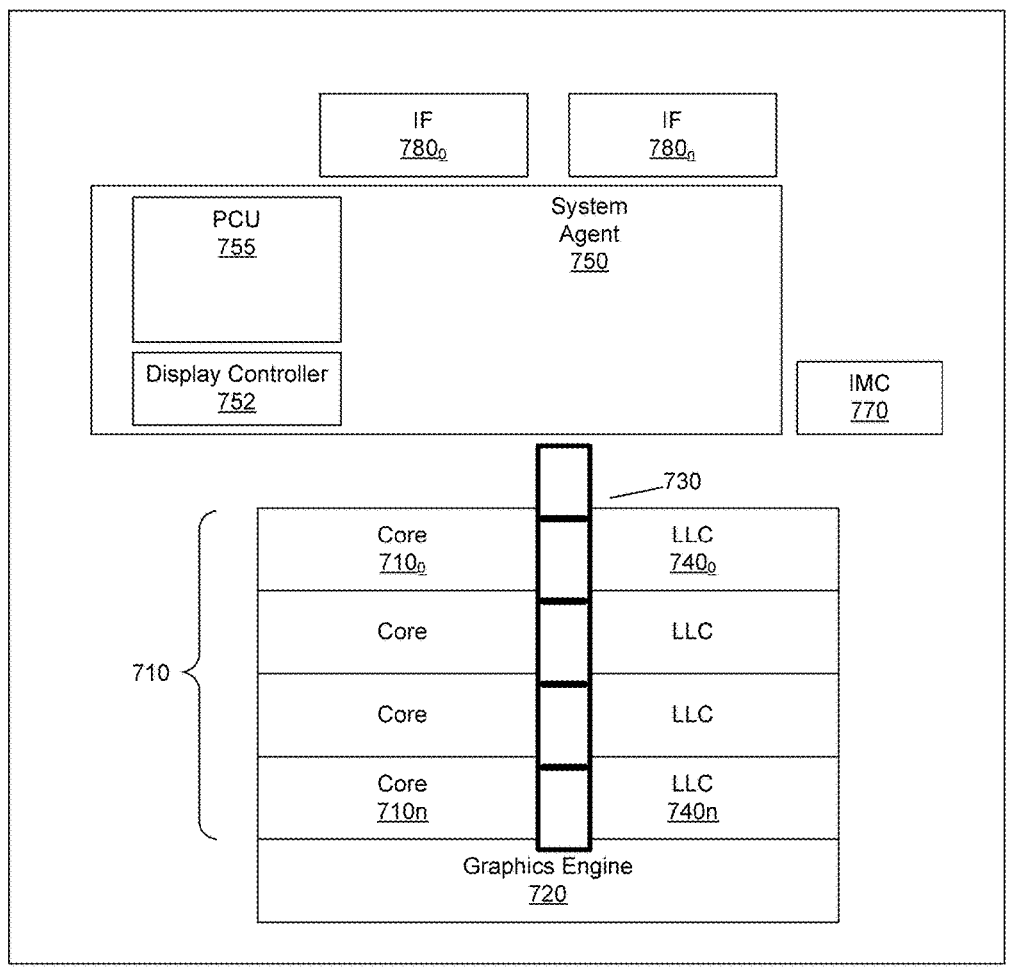
FIG. 8 is a block diagram of a processor in accordance with an embodiment of the present invention.

Referring now to FIG. 8, shown is a block diagram of a multicore processor in accordance with an embodiment of the present invention. As shown in the embodiment of FIG. 8, processor 700 includes multiple domains. Specifically, a core domain 710 can include a plurality of cores $710_0$-$710_n$, a graphics domain 720 can include one or more graphics engines, and a system agent domain 750 may further be present. In various embodiments, system agent domain 750 may handle power control events and power management such that individual units of domains 710 and 720 such as cores and/or graphics engines can be controlled to independently dynamically operate at an appropriate turbo mode frequency in light of the activity (or inactivity) occurring in the given unit. Each of domains 710 and 720 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core $710_0$-$710_n$ may further include low level caches in addition to various execution units and additional processing elements. In some embodiments, both execution units within cores 710 and graphics processor engines within graphics domain 720 may include logic to perform cycle compression as described herein. In turn, the various cores may be coupled to each other and to a shared cache memory formed of a plurality of units of a last level cache (LLC) $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755.

As further seen in FIG. 8, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 8, understand the scope of the present invention is not limited in this regard.

Figure 9:
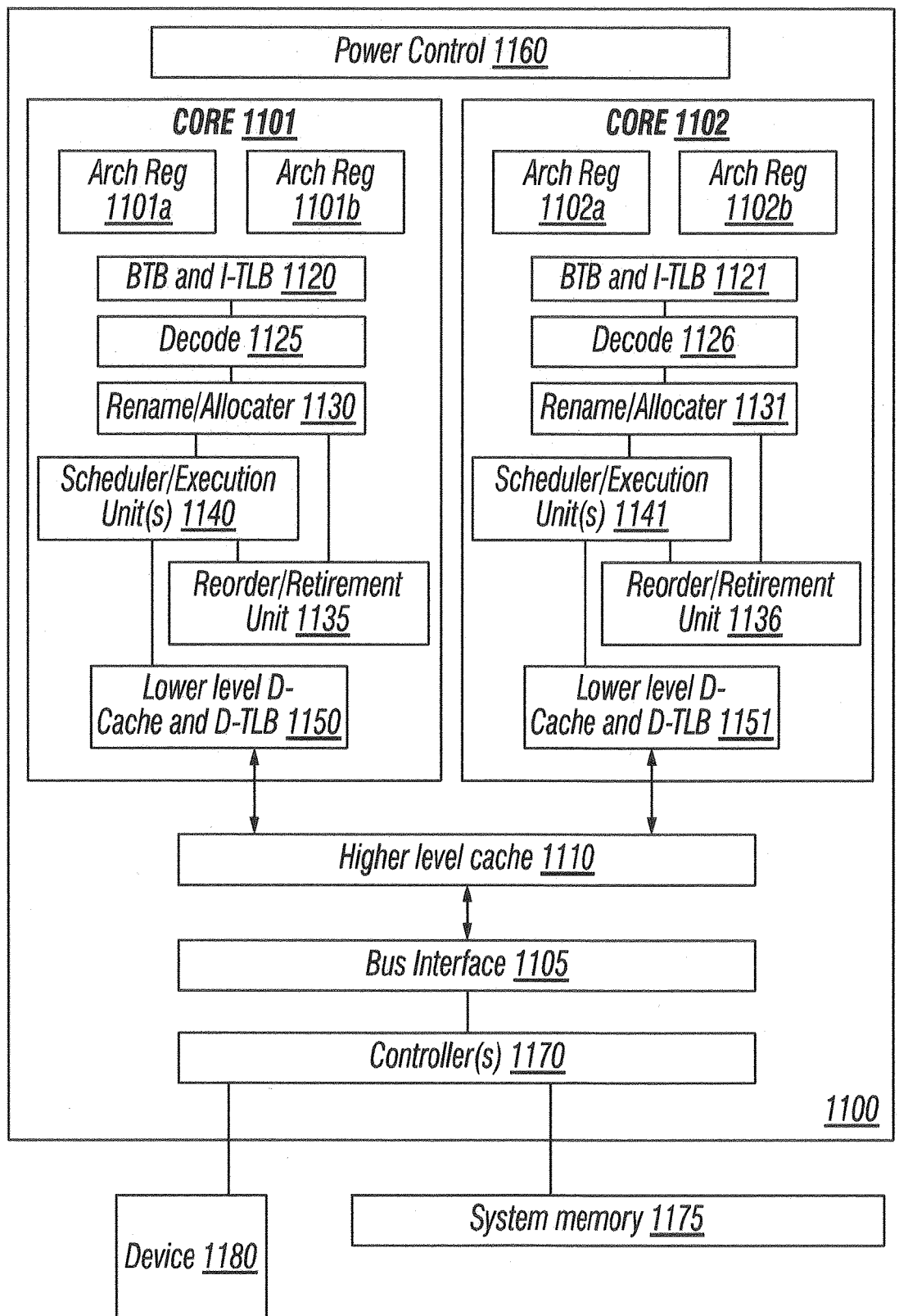
FIG. 9 is a block diagram of a processor in accordance with another embodiment of the present invention.

Referring to FIG. 9, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 9, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core, and which may include vector processing capabilities such as graphics processing using cycle compression as described herein. However, cores 1101 and 1102 may be individually selected from any type of core, such as a native core, a software managed core, a core adapted to execute a native ISA including CTT instructions as described herein, a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125, 1126 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125, 1126 includes circuitry that recognizes these instructions from their opcodes and passes the decoded instructions on in the pipeline for processing as defined by the first ISA. For example, decoders 1125, 1126, in one embodiment, include logic designed or adapted to recognize specific instructions, such as transactional instruction. As a result of the recognition by decoders 1125, 1126, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130, 1131 includes an allocator to reserve resources, such as register files to store instruction processing results. However, threads 1101a and 1101b are potentially capable of out-of-order execution, where allocator and renamer block 1130, 1131 also reserves other resources, such as reorder buffers to track instruction results. Unit 1130, 1131 may also include a register renamer to rename program/instruction reference registers to other registers internal to processor 1100. Reorder/retirement unit 1135, 1136 includes components, such as the reorder buffers mentioned above, load buffers, and store buffers, to support out-of-order execution and later in-order retirement of instructions executed out-of-order.

Scheduler and execution unit(s) block 1140, 1141, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150, 1151 are coupled to execution unit(s) 1140, 1141. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 10:
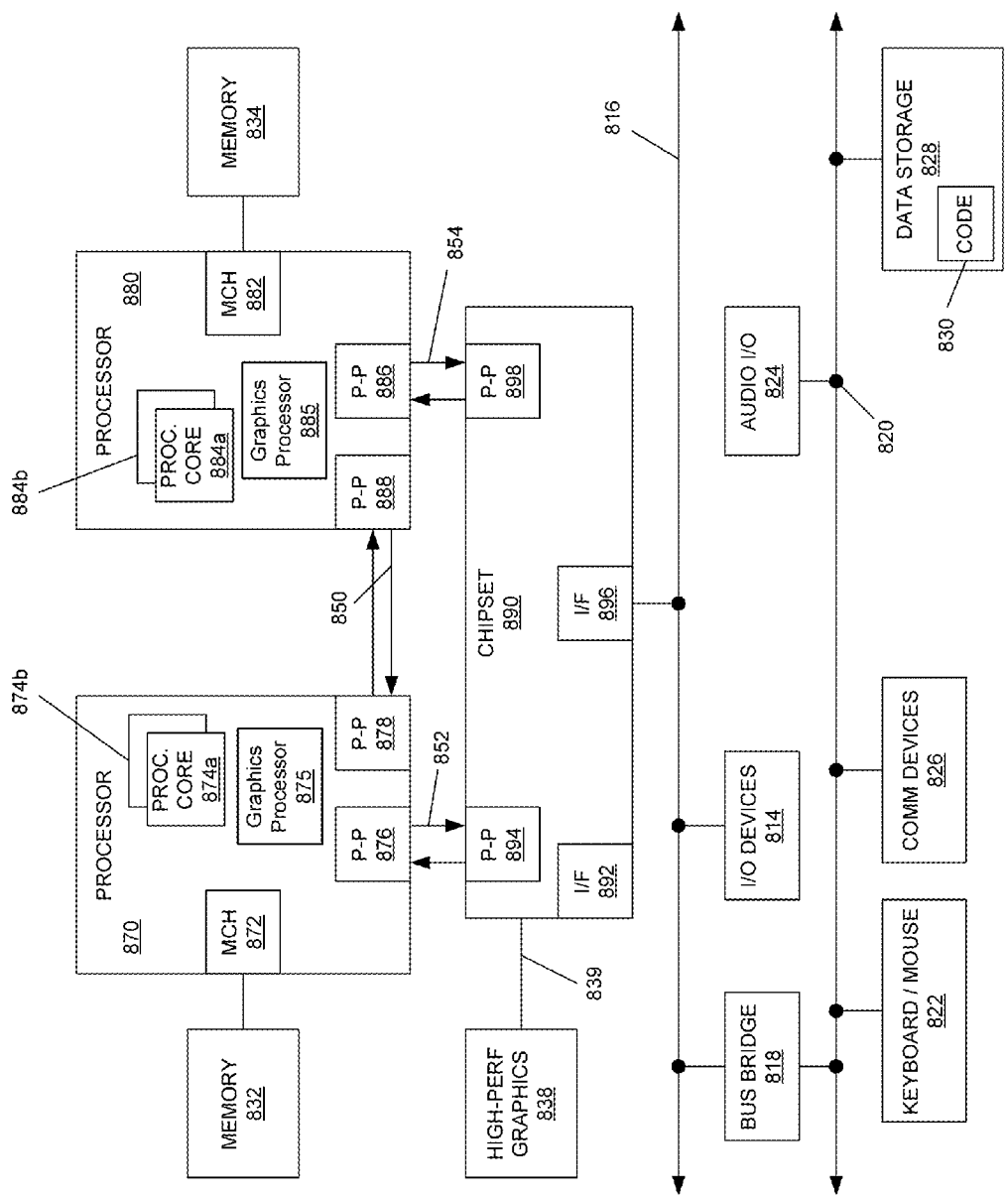
FIG. 10 is a block diagram of a system in accordance with an embodiment of the present invention.

Embodiments may be implemented in many different system types. Referring now to FIG. 10, shown is a block diagram of a system in accordance with an embodiment of the present invention. As shown in FIG. 10, multiprocessor system 800 is a point-to-point interconnect system, and includes a first processor 870 and a second processor 880 coupled via a point-to-point interconnect 850. As shown in FIG. 10, each of processors 870 and 880 may be multicore processors, including first and second processor cores (i.e., processor cores 874a and 874b and processor cores 884a and 884b) and one or more graphics processors (i.e., graphics processors 875 and 885), although potentially many more cores and graphics processors may be present in the processors. Each of the graphics processors (and/or cores) can include cycle compression logic to reduce the number of execution cycles to execute vector instructions as described herein.

Still referring to FIG. 10, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 10, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 10, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 10, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   an execution unit having a data path including a plurality of lanes, each of the lanes to execute an operation on at least one channel of a plurality of channels of a single instruction multiple data (SIMD) instruction responsive to the SIMD instruction, the execution unit having a plurality of quadrants and to perform the SIMD instruction in a number of execution cycles; and
   a decode logic including compaction circuitry to calculate a minimum number of execution cycles to execute the SIMD instruction based on an active lane count, compare the minimum number of execution cycles to an active quadrant value, and based on the comparison, compact the number of execution cycles, including permutation of at least some of the plurality of channels of the SIMD instruction, wherein a number of permutations between the quadrants is minimized by the compaction circuitry, to reduce the number of execution cycles for execution of the SIMD instruction based at least in part on the calculation and an execution mask associated with the SIMD instruction, the execution mask based at least in part on an instruction predicate mask, a dispatch mask and a conditional mask.

2. The processor of claim 1, wherein the compaction circuitry is to reduce the number of execution cycles for execution of the SIMD instruction by at least one execution cycle when the execution mask indicates that a set of channels of the SIMD instruction to be issued to the execution unit during the at least one execution cycle are to be unused.

3. The processor of claim 2, wherein the compaction circuitry is to cause a next set of channels of the SIMD instruction to be inserted into the at least one execution cycle.

4. The processor of claim 2, wherein the execution unit is to execute the SIMD instruction in a first number of execution cycles less than the number of execution cycles as a result of reduction of the number of execution cycles by the at least one execution cycle.

5. The processor of claim 1, further comprising permute circuitry coupled to the execution unit to permute at least some of the plurality of channels of the SIMD instruction prior to input to the execution unit, responsive to control information from the compaction circuitry.

6. The processor of claim 5, wherein a first portion of the plurality of channels obtained from the permutation are to be sent to the execution unit, and a second portion of the plurality of channels obtained from the permutation are not to be sent to the execution unit.

7. The processor of claim 1, wherein the SIMD instruction is of a first path of a conditional block.

8. The processor of claim 1, wherein the SIMD instruction is of a variable width SIMD instruction set architecture.

9. The processor of claim 1, further comprising a split register file having a first set of half registers each to store a first plurality of channels of a SIMD instruction and a second set of half registers each to store a second plurality of channels of the SIMD instruction.

10. The processor of claim 1, further comprising:
   a register file having a plurality of registers each to store a plurality of channels of a SIMD instruction;
   a latch to receive an operand from a register of the register file;
   permute circuitry coupled to the latch to receive the operand from the latch and control information from the decode logic and to permute at least portions of the operand; and
   an output logic coupled to the permute circuitry and including a plurality of switches, wherein a corresponding switch is to be enabled by the compaction circuitry to provide a corresponding portion of the permuted operand to the execution unit.

11. A non-transitory machine-readable medium having stored thereon instructions, which when performed by a machine cause the machine to perform a method comprising:
receiving a single instruction multiple data (SIMD) instruction and information associated with the SIMD instruction in a SIMD execution unit of a processor, the SIMD instruction having a plurality of channels that are to consume a first plurality of execution cycles, the SIMD execution unit having a plurality of quadrants;
identifying a first portion of the plurality of channels of the SIMD instruction that are to be disabled;
calculating a minimum number of execution cycles to execute the SIMD instruction based on an active lane count, comparing the minimum number of execution cycles to an active quadrant value, and based on the comparing, compacting the first plurality of execution cycles, including permuting at least some of the plurality of channels of the SIMD instruction, wherein a number of permutations between the quadrants is minimized;
removing one or more execution cycles of the first plurality of execution cycles for executing the SIMD instruction based on the calculating; and
after the removing, executing the SIMD instruction in fewer execution cycles than the first plurality of execution cycles.

12. The non-transitory machine-readable medium of claim 11, wherein the method further comprises inserting a second portion of the plurality of channels of the SIMD instruction into a first removed execution cycle.

13. The non-transitory machine-readable medium of claim 11, wherein the method further comprises inserting a second portion of a plurality of channels of a second SIMD instruction into a first removed execution cycle.

14. The non-transitory machine-readable medium of claim 13, wherein the SIMD instruction is of a first branch of a conditional operation and the second SIMD instruction is of a second branch of the conditional operation.

15. The non-transitory machine-readable medium of claim 11, wherein the method further comprises permuting the at least some of the plurality of channels of the SIMD instruction, and thereafter identifying the first portion of the plurality of channels of the SIMD instruction that are to be disabled.

16. A system comprising:
a processor comprising:
a core domain including a plurality of cores to independently execute instructions; and
a graphics domain including a plurality of graphics processors to perform general purpose workloads offloaded by the core domain, each of the graphics processors having a vector execution unit including a plurality of lanes each to execute an operation on at least one data element of a plurality of data elements identified by a vector instruction, the vector execution unit to perform the vector instruction on the plurality of data elements in a first number of execution cycles, and cycle compression circuitry coupled to the vector execution unit to reduce the first number of execution cycles based at least in part on an execution mask associated with the vector instruction, the execution mask based at least in part on an instruction predicate mask, a dispatch mask and a conditional mask, permute circuitry having an output coupled to an input to the vector execution unit to permute at least some of the plurality of data elements prior to input to the vector execution unit, responsive to control information from the cycle compression circuitry, and unpermute circuitry having an input coupled to an output of the vector execution unit to unpermute at least some of the plurality of data elements after output from the vector execution unit, responsive to control information from the cycle compression circuitry; and
a dynamic random access memory (DRAM) coupled to the processor.

17. The system of claim 16, wherein the cycle compression circuitry is to cause permutation of a first data element in a first channel of the vector instruction having a first lane in the vector execution unit to a second channel of the vector instruction having the first lane.

18. The system of claim 17, wherein the cycle compression circuitry is to thereafter cause permutation of a second data element in a third channel of the vector instruction having the first lane to a fourth channel of the vector instruction having a second lane in the vector execution unit.

19. The system of claim 16, wherein each of the graphics processors comprises a thread dispatch unit, a compute cluster coupled to the thread dispatch unit, the compute cluster including a plurality of vector execution units and at least one shared cache, and a second shared cache coupled to the compute cluster.

20. The system of claim 19, wherein the graphics domain is coupled to the graphics domain, to the core domain and to a system agent circuit of the processor via an interconnect.

21. The system of claim 20, wherein the system agent circuit further includes a third shared cache, the third shared cache shared by the core domain and the graphics domain.

22. A processor comprising:
a vector execution unit having a plurality of quadrants, wherein the vector execution unit is to execute a vector instruction on a vector having a plurality of individual data elements, wherein the vector instruction is of a first width and the vector execution unit is of a second width less than the first width; and
control circuitry coupled to the vector execution unit to compress a number of execution cycles consumed in execution of the vector instruction when at least some of the individual data elements are not to be operated on by the vector instruction, the control circuitry to calculate a minimum number of execution cycles to execute the vector instruction based on an active lane count, compare the minimum number of execution cycles to an active quadrant value, and based on the comparison, compress the number of execution cycles, and permute at least some of the plurality of individual data elements of the vector instruction, wherein a number of permutations between the quadrants is minimized by the control circuitry, the control circuitry to compress the number of execution cycles based at least in part on the calculation and an execution mask associated with the vector instruction, the execution mask based at least in part on an instruction predicate mask, a dispatch mask and a conditional mask.

23. The processor of claim 22, wherein the control circuitry is to reduce the number of execution cycles for execution of the vector instruction when the execution mask indicates that a set of the individual data elements to be issued to the vector execution unit during the at least one execution cycle are to be disabled and to cause a next set of the individual data elements to be issued to the vector execution unit during the at least one execution cycle.

24. The processor of claim 23, wherein the control circuitry is to cause at least a portion of the vector execution unit to be powered down for the reduced at least one execution cycle.

25. The processor of claim 23, wherein the control circuitry is to cause at least a portion of a second vector associated with a second vector instruction to be issued to the vector execution unit during the reduced at least one execution cycle.

26. The processor of claim 22, further comprising permute circuitry coupled to the vector execution unit to permute at least some of the plurality of individual data elements prior to input to the vector execution unit.

* * * * *